(12) United States Patent
Huber et al.

(10) Patent No.: US 8,517,454 B1
(45) Date of Patent: Aug. 27, 2013

(54) VEHICLE FRONT ENERGY ABSORBER

(75) Inventors: Matthew Huber, Novi, MI (US); Hugo Fortin, Commerce Township, MI (US); Patrick Grattan, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 13/530,587

(22) Filed: Jun. 22, 2012

(51) Int. Cl.
*B60R 19/22* (2006.01)

(52) U.S. Cl.
USPC ............. 296/187.09; 293/120; 293/121

(58) Field of Classification Search
USPC .... 293/109, 120–122, 132, 133; 296/187.03, 296/187.04, 187.09, 187.11
See application file for complete search history.

(56) References Cited

U.S. PATENT DOCUMENTS

| | | | |
|---|---|---|---|
| 3,891,258 A * | 6/1975 | Barenyi | 293/120 |
| 4,348,042 A * | 9/1982 | Scrivo | 293/120 |
| 4,457,547 A * | 7/1984 | Sekiyama et al. | 293/110 |
| 4,762,352 A * | 8/1988 | Enomoto | 293/120 |
| 5,154,462 A | 10/1992 | Carpenter | |
| 6,406,081 B1 | 6/2002 | Mahfet et al. | |
| 6,609,740 B2 | 8/2003 | Evans | |
| 6,669,252 B2 * | 12/2003 | Roussel et al. | 293/120 |
| 6,685,243 B1 | 2/2004 | Evans | |
| 6,726,262 B2 | 4/2004 | Marijnissen et al. | |
| 6,848,730 B2 | 2/2005 | Evans | |
| 6,874,832 B2 | 4/2005 | Evans et al. | |
| 6,877,785 B2 * | 4/2005 | Evans et al. | 293/120 |
| 6,890,009 B2 | 5/2005 | Murata et al. | |
| 6,949,209 B2 | 9/2005 | Zander et al. | |
| 7,044,515 B2 | 5/2006 | Mooijman et al. | |
| 7,134,700 B2 | 11/2006 | Evans | |
| 7,144,054 B2 | 12/2006 | Evans | |
| 7,147,258 B2 | 12/2006 | Evans et al. | |
| 7,188,876 B2 | 3/2007 | Jaarda et al. | |
| 7,204,531 B2 * | 4/2007 | Kim | 293/120 |
| 7,390,039 B2 | 6/2008 | Adachi et al. | |
| 7,399,014 B2 | 7/2008 | Mellis et al. | |
| 7,575,259 B2 * | 8/2009 | Hasegawa | 293/120 |
| 8,016,331 B2 * | 9/2011 | Ralston et al. | 293/120 |
| 2005/0046206 A1 * | 3/2005 | Ohno et al. | 293/120 |
| 2006/0131901 A1 | 6/2006 | Nguyen et al. | |
| 2006/0185923 A1 | 8/2006 | Tanabe | |
| 2007/0046044 A1 * | 3/2007 | Tanabe | 293/120 |

(Continued)

FOREIGN PATENT DOCUMENTS

| | | |
|---|---|---|
| JP | 2002-331886 | 11/2002 |
| WO | WO-2003-039916 | 5/2003 |

*Primary Examiner* — Glenn Dayoan
*Assistant Examiner* — Gregory Blankenship
(74) *Attorney, Agent, or Firm* — Global IP Counselors, LLP (57) ABSTRACT

A vehicle front energy absorber includes a back wall section, an upper absorption section and a lower absorption section. The upper absorption section has a first upper surface extending frontward from an upper lengthwise edge of the back wall section with a first upper obtuse angle being defined between the back wall section and the first upper surface. The lower absorption section includes a first lower surface that extends frontward from a lower lengthwise edge of the back wall section with a first lower obtuse angle being defined between the back wall section and the first lower surface. The upper absorption section, the back wall section and the lower absorption section having a transverse U-shape in cross-section that defines a lengthwise concave channel having a longitudinal opening, the first upper surface and the first lower surface diverging away from one another in frontward directions from the back wall section.

20 Claims, 7 Drawing Sheets

(56) References Cited

U.S. PATENT DOCUMENTS

| | | |
|---|---|---|
| 2007/0132251 A1 | 6/2007 | Lee |
| 2007/0145755 A1* | 6/2007 | Shioya et al. ............. 293/121 |
| 2007/0187959 A1* | 8/2007 | Adachi et al. ............. 293/120 |
| 2009/0167037 A1 | 7/2009 | Czopek et al. |
| 2011/0133497 A1 | 6/2011 | Vikstrom |
| 2012/0032458 A1 | 2/2012 | Brooks et al. |

\* cited by examiner

VEHICLE FRONT ENERGY ABSORBER

BACKGROUND

1. Field of the Invention

The present invention generally relates to a vehicle front energy absorber. More specifically, the present invention relates to a vehicle front energy absorber having a plurality of impact reactions in response to differing levels of head-on impact force during an impact event.

2. Background Information

Front bumper assemblies of vehicles have been designed to absorb a prescribed level of force during head-on impact event. Typically such front bumper assemblies include a fascia, a rigid backing member and an energy absorber disposed therebetween. The energy absorber is typically designed to absorb a prescribed level of force during an impact event. The goal behind such energy absorption has typically been to minimize the forces applied to the interior compartment and/or exterior obstacles during a head on collision. The energy absorbers in current bumper assemblies typically undergo non-reproducible forms of deformation and/or damage.

SUMMARY

One object is to provide a front energy absorber with a reproducible impact response.

Another object is to provide a front energy absorber with a plurality of impact reaction stages during a head-on impact event.

In view of the state of the known technology, one aspect of the present disclosure is to provide a vehicle front energy absorber with a back wall section, an upper absorption section and a lower absorption section. The back wall section has front and rear lengthwise surfaces facing in opposite directions. The rear lengthwise surface of the back wall section has an upper lengthwise edge and a lower lengthwise edge. The upper absorption section has a first upper surface, a second upper surface and an upper distal end surface. The first upper surface extends frontward from the upper lengthwise edge with a first upper obtuse angle being defined between the rear lengthwise surface and the first upper surface. The second upper surface extends frontward from the first upper surface with a second upper obtuse angle being defined between the first upper surface and the second upper surface. The upper distal end surface extends downward away from the second upper surface. The lower absorption section has a first lower surface, a second lower surface and a lower distal end surface. The first lower surface extends frontward from the lower lengthwise edge with a first lower obtuse angle being defined between the rear lengthwise surface and the first lower surface. The second lower surface extends frontward from the first lower surface with a second lower obtuse angle being defined between the first lower surface and the second lower surface. The lower distal end surface extends upward away from the second lower surface. The upper absorption section, the back wall section and the lower absorption section having a transverse U-shape in cross-section that defines a lengthwise concave channel having a longitudinal opening. The first upper surface and the first lower surface diverge away from one another in frontward directions from the back wall section.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
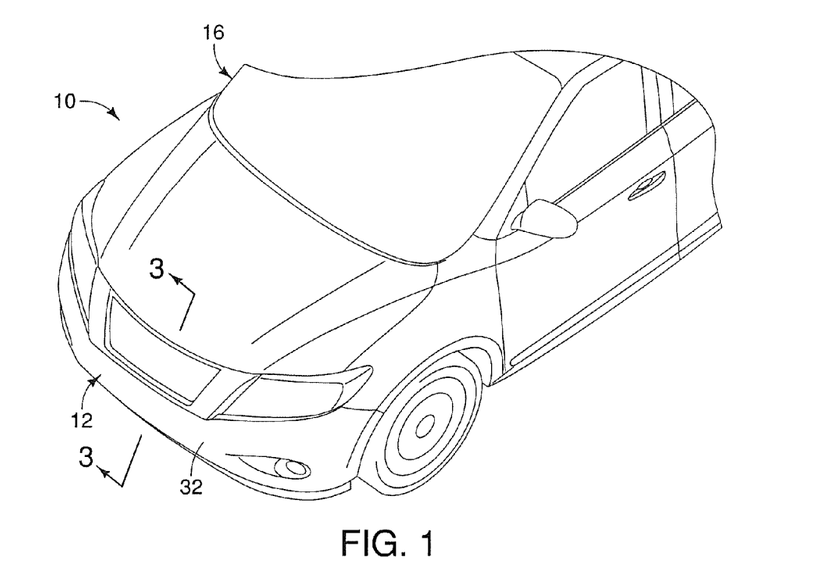
FIG. 1 is a perspective view of a front end of a vehicle showing a front fascia of a front bumper assembly in accordance with one embodiment.

Referring initially to FIG. 1, a vehicle 10 with a front bumper assembly 12 is illustrated in accordance with a first embodiment. As indicated in FIGS. 2-6, the front bumper assembly 12 includes an energy absorber 14 (a vehicle front energy absorber), as is described in greater detail below.

Figure 2:
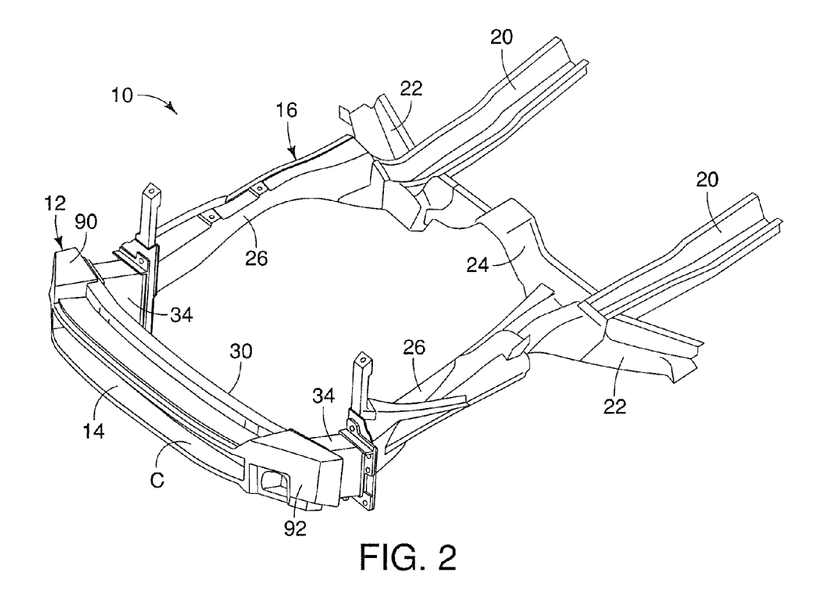
FIG. 2 is a perspective view of the front end of the vehicle with various elements and components removed showing a vehicle front energy absorber of the bumper assembly attached to a vehicle body structure of the vehicle in accordance with the one embodiment.

The vehicle 10 includes, among other features, a vehicle body structure 16 and the front bumper assembly 12. As shown in FIG. 2, the vehicle body structure 16 includes main body structural elements 20, outrigger elements 22, a cross-support element 24 and front strut support elements 26. The front bumper assembly 12 is attached to respective front ends of the front strut support elements 26. Since the various elements of the vehicle body structure 16 such as the main body structural elements 20, the outrigger elements 22, the cross-support element 24 and the front strut support elements 26 are conventional elements, further description is omitted for the sake of brevity. It should also be understood from the drawings and the description herein that the vehicle body structure 16 is not limited to the specific arrangement depicted in FIG. 2. For example, the front bumper assembly 12 can be used on vehicles that have traditional frame and body elements or on vehicles having a uni-body construction.

As shown in FIGS. 3-6, the front bumper assembly 12 includes a rigid reinforcement member 30, a fascia member 32 (FIG. 3 only) and the energy absorber 14. The reinforcement member 30 is a conventional beam preferably made of metal such as steel or another rigid material, and spans the distance between the two front strut support elements 26. The reinforcement member 30 is mounted to the two front strut support elements 26 by conventional brackets 34. The reinforcement member 30 includes a plurality of openings 36 that are used to install the energy absorber 14, as described in greater detail below.

Figure 3:
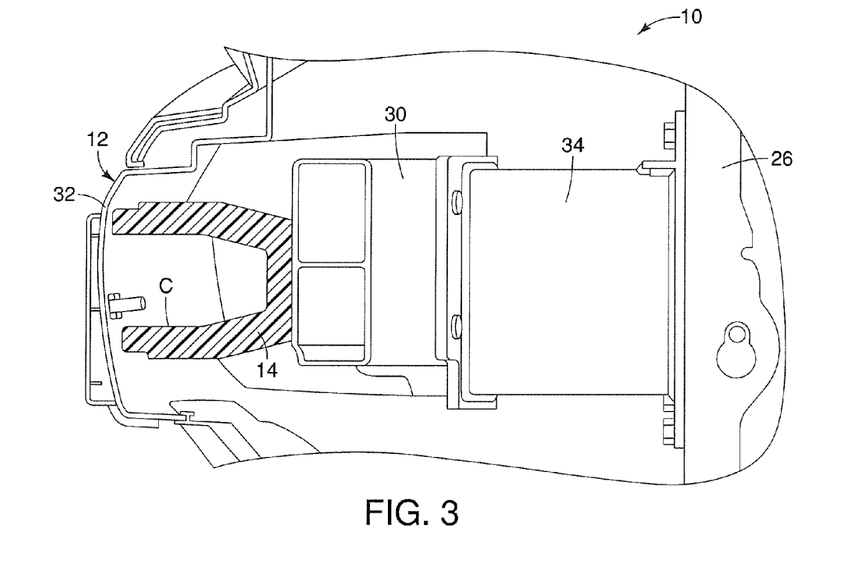
FIG. 3 is a cross-sectional view of the front end of the vehicle taken along the line 3-3 in FIG. 1, showing the vehicle front energy absorber in accordance with the one embodiment.

The fascia member 32 is attached to the vehicle body structure 16 in a conventional manner such that the energy absorber 14 is disposed between the fascia member 32 and the reinforcement member 30. Typically, the fascia member 32 is not directly or necessarily attached to the reinforcement member 30, however it is possible to connect the fascia member 32 to the reinforcement member 30. In the depicted embodiment, the fascia member 32 is conventionally attached to fenders and other structural elements (not shown) of the vehicle body structure 16. Further, the fascia member 32 is preferably spaced apart from the energy absorber 14 by a predetermined distance. Since the reinforcement member 30 and the fascia member 32 are conventional elements of the vehicle body structure 16, further description is omitted for the sake of brevity.

A description of the energy absorber 14 is now provided with specific reference to FIGS. 7-10. The energy absorber 14 includes a back wall section 40, an upper absorption section 42 and a lower absorption section 44. The back wall section 40, the upper absorption section 42 and the lower absorption section 44 define a transverse U-shape in cross-section (FIGS. 9 and 10) that defines a lengthwise concave channel C (FIGS. 2-5 and 9-10). The back wall section 40, the upper absorption section 42 and the lower absorption section 44 are formed together as a single, unitary, monolithic element. For example, the energy absorber 14 can be made in an injection molding process. An expanding foam material or injection molding foam material can be used.

Figure 7:
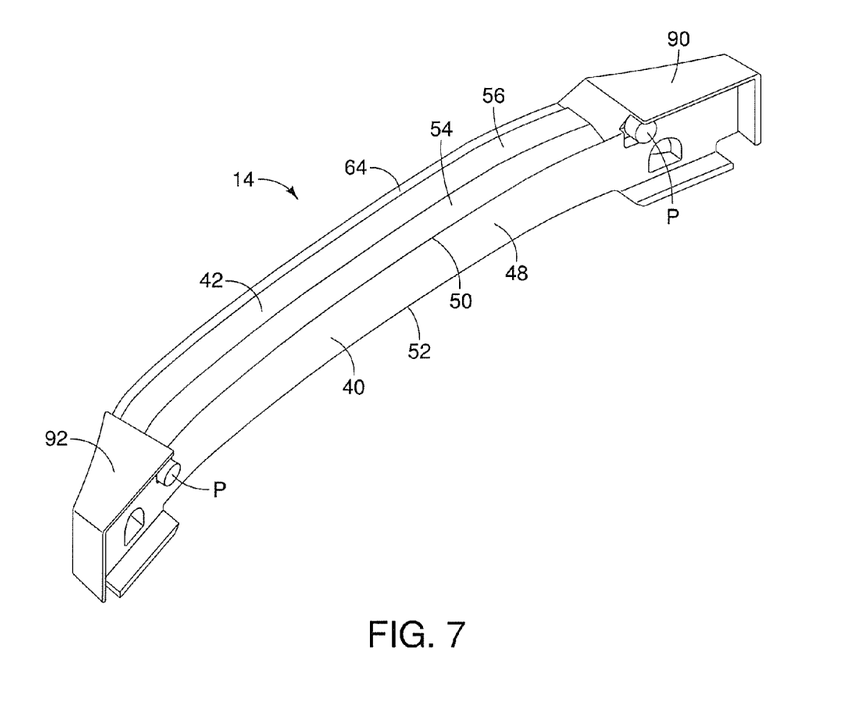
FIG. 7 is a perspective view of the vehicle front energy absorber in accordance with the one embodiment.
Figure 8:
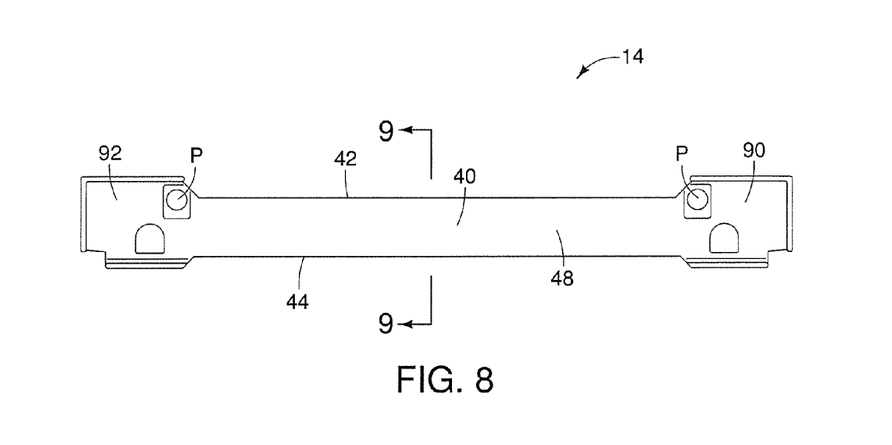
FIG. 8 is a rear view of the vehicle front energy absorber in accordance with the one embodiment.
Figure 9:
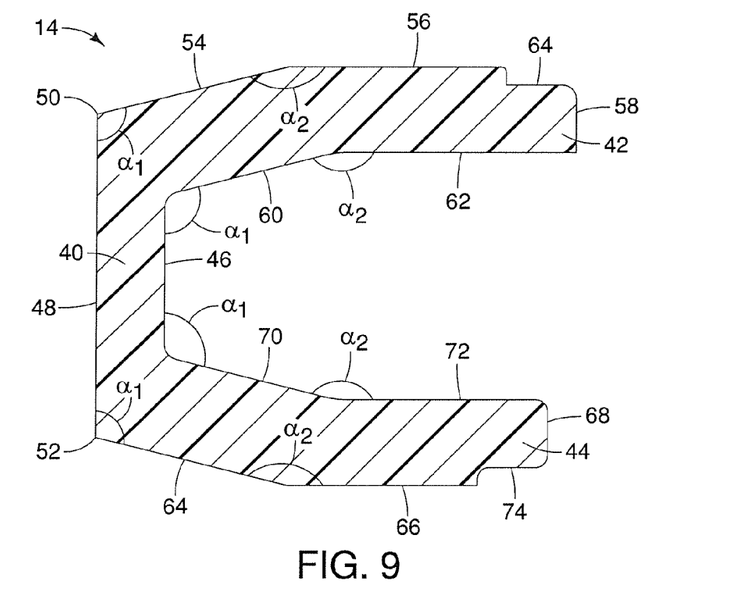
FIG. 9 is a cross-sectional view of the vehicle front energy absorber taken along the line 9-9 in FIG. 8, in accordance with the one embodiment.

As shown in FIG. 9, the back wall section 40 has a front lengthwise surface 46 and a rear lengthwise surface 48 that face in opposite directions. Specifically, when installed in the vehicle 10, the front lengthwise surface 46 faces forward and the rear lengthwise surface 48 faces rearward relative to the vehicle 20. Further, the front lengthwise surface 46 is concealed by the fascia member 32 and the rear lengthwise surface 48 extends along a front surface of the reinforcement member 30. The rear lengthwise surface 46 of the back wall section 40 has an upper lengthwise edge 50 and a lower lengthwise edge 52. As indicated in FIG. 7, the rear lengthwise surface 48 of the back wall section 40 has a lateral arcuate contour viewed from above.

As shown in FIG. 9, the upper absorption section 42 has a first upper surface 54, a second upper surface 56, an upper distal end surface 58, a first upper channel surface 60 and a second upper channel surface 62 extending along the channel C. As shown in FIG. 9, the first upper surface 54 extends frontward from the upper lengthwise edge 50 with a first obtuse angle $\alpha_1$ being defined between the rear lengthwise surface 48 and the first upper surface 54. The second upper surface 56 extends frontward from the first upper surface 54 with a second obtuse angle $\alpha_2$ being defined between the first upper surface 54 and the second upper surface 56. The upper distal end surface 58 extends downward away from the second upper surface 56. The second upper surface 56 of the upper absorption section 42 includes a rabbet 64 along the upper distal end surface 58 of the upper absorption section 42.

The first upper channel surface 60 extends frontward from an upper end of the front lengthwise surface 46 of the back wall section 40 parallel to the first upper surface 54. Consequently, the first obtuse angle $\alpha_1$ is also defined between the first upper channel surface 60 and the front lengthwise surface 46 of the back wall section 40.

The second upper channel surface 62 extends frontward from the first upper channel surface 60 parallel to the second upper surface 56. Consequently, the second obtuse angle $\alpha_2$ is also defined between the first upper channel surface 60 and second upper channel surface 62.

The lower absorption section 44 has a first lower surface 64, a second lower surface 66, a lower distal end surface 68, a first lower channel surface 70 and a second lower channel surface 72 extending along the channel C. The first lower surface 64 extends frontward from the lower lengthwise edge 52 with the first obtuse angle $\alpha_1$ being defined between the rear lengthwise surface 48 and the first lower surface 64. The second lower surface 66 extends frontward from the first lower surface 64 with the second obtuse angle $\alpha_2$ being defined between the first lower surface 64 and the second lower surface 66. The lower distal end surface 68 extends upward away from the second lower surface 66. The second lower surface 66 of the lower absorption section 44 includes a rabbet 74 along the lower distal end surface 68 of the lower absorption section 44.

The first lower channel surface 70 extends frontward from an lower end of the front lengthwise surface 46 of the back wall section 40 parallel to the first lower surface 64. Consequently, the first obtuse angle $\alpha_1$ is also defined between the first lower channel surface 70 and the front lengthwise surface 46 of the back wall section 40.

The second lower channel surface 72 extends frontward from the first lower channel surface 70 parallel to the second upper surface 66. Consequently, the second obtuse angle $\alpha_2$ is also defined between the first lower channel surface 70 and second lower channel surface 72.

The upper absorption section 42, the back wall section 40 and the lower absorption section 44 have a transverse U-shape in cross-section that defines the lengthwise concave channel C having a longitudinal opening. As is shown in FIG. 9, the first upper surface 54 and the first lower surface 64 diverge away from one another in frontward directions from the back wall section 40. Further, the second upper surface 56 of the upper absorption section 42 and the second lower surface 66 of the lower absorption section 44 extend perpendicularly to the rear lengthwise surface 48 of the back wall section 40. As well, the upper distal end surface 58 of the upper absorption section 42 and the lower distal end surface 68 of the lower absorption section 44 both extend parallel to the rear lengthwise surface 48 of the back wall section 40.

As indicated in FIG. 9, the first obtuse angle $\alpha_1$ is between 95 and 115 degrees. The second obtuse angle $\alpha_2$ is between 155 and 175 degrees. However, in a preferred embodiment, first obtuse angle $\alpha_1$ is 105 degrees and the second obtuse angle $\alpha_2$ is 165 degrees.

Figure 10:
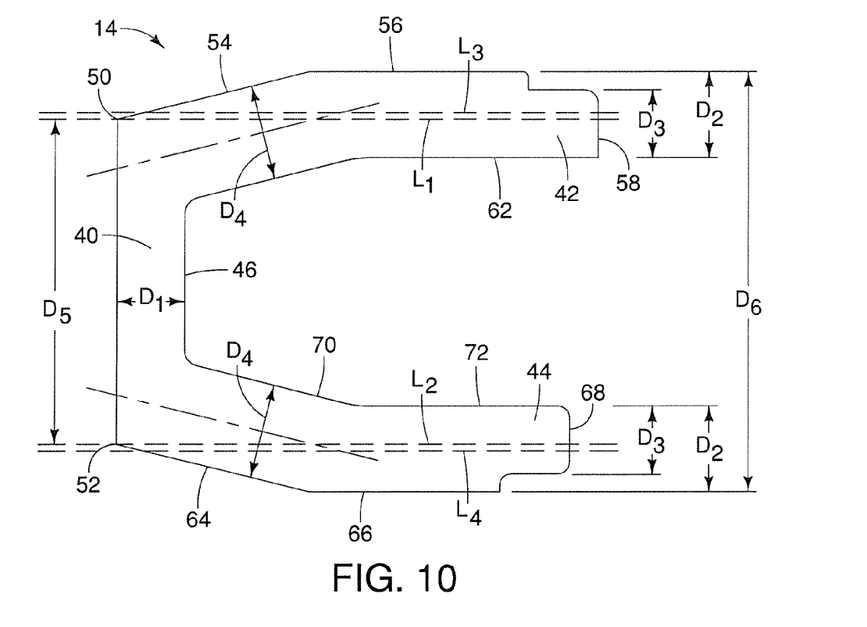
FIG. 10 is a schematic cross-sectional view of the vehicle front energy absorber in a non-impacted state showing various dimensional relationships between the various surfaces of the vehicle front energy absorber in accordance with the one embodiment.

Various dimensions of the energy absorber 14 are now described with reference to FIG. 10. Specifically, the back wall section 40 has a dimension or first thickness $D_1$ measured between the front and rear lengthwise surfaces 46 and 48. The upper absorption section 42 has a second thickness $D_2$ measured between the second upper channel surface 62 and the second upper surface 56, with the second thickness $D_2$ being greater than the first thickness $D_1$. Similarly, the lower absorption section 44 has a thickness measured between the second lower channel surface 72 and the second lower surface 66 that is equal to the second thickness $D_2$. The upper absorption section 42 and the lower absorption section 44 each have a third thickness $D_3$ is measured between their respective rabbets 64 and 74, and their respective second upper and lower channel surfaces 62 and 72, where the thickness $D_3$ is less than the thickness $D_2$.

The upper absorption section 42 has a fourth thickness $D_4$ measured between the first upper channel surface 60 and the first upper surface 54, with the fourth thickness $D_4$ being equal to the second thickness $D_2$. However, it is conceived by the inventors that the thicknesses $D_4$ and $D_2$ can alternatively be formed such that they are not equal. Similarly, the lower absorption section 44 has a thickness measured between the first lower channel surface 70 and the first lower surface 64 that is equal to the fourth thickness $D_4$.

A distance $D_5$ is measured between the upper lengthwise edge 50 and the lower lengthwise edge 52 of the back wall section 40. A distance $D_6$ is measured between the second upper surface 56 and the second lower surface 66. As is shown in FIG. 10, the distance $D_6$ is greater than the distance $D_5$.

A first line $L_1$ extends from the upper lengthwise edge 50 perpendicularly to the rear lengthwise surface 48 of the back wall section 40. Due to the geometric and dimensional relationships described above, the first line $L_1$ does not extend through a vertical center of the portion of the upper absorption section 42 between the second upper surface 56 and the second upper channel surface 62. Rather, a third line $L_3$ extends through a vertical center of the portion of the upper absorption section 42 between the second upper surface 56 and the second upper channel surface 62 and is parallel to but vertically spaced apart from the first line $L_1$. Consequently, a majority of the portion of the upper absorption section 42 between the second upper surface 56 and the second upper channel surface 62 is vertically situated above the upper lengthwise edge 50. Similarly, a second line $L_2$ extends from the lower lengthwise edge 52 perpendicularly to the rear lengthwise surface 48 of the back wall section 40. Due to the geometric and dimensional relationships described above, the second line $L_2$ does not extend through a vertical center of the portion of the lower absorption section 44 between the second lower surface 66 and the second lower channel surface 72. Rather, a fourth line $L_4$ extends through a vertical center of the portion of the lower absorption section 44 between the second lower surface 66 and the second lower channel surface 72 and is parallel to but vertically spaced apart from the second line $L_2$. Consequently, a majority of the portion of the lower absorption section 44 between the second lower surface 66 and the second lower channel surface 72 is vertically situated below the lower lengthwise edge 52.

Figure 11:
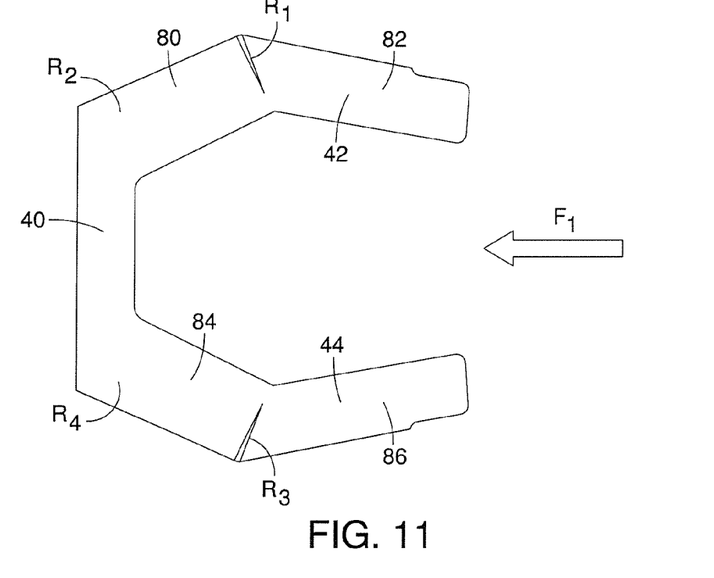
FIG. 11 is a schematic cross-sectional view of the vehicle front energy absorber showing the vehicle front energy absorber after a head-on impact event between a first and a second impact force range showing slight deformation at first and second fracture regions in accordance with the one embodiment.
Figure 12:
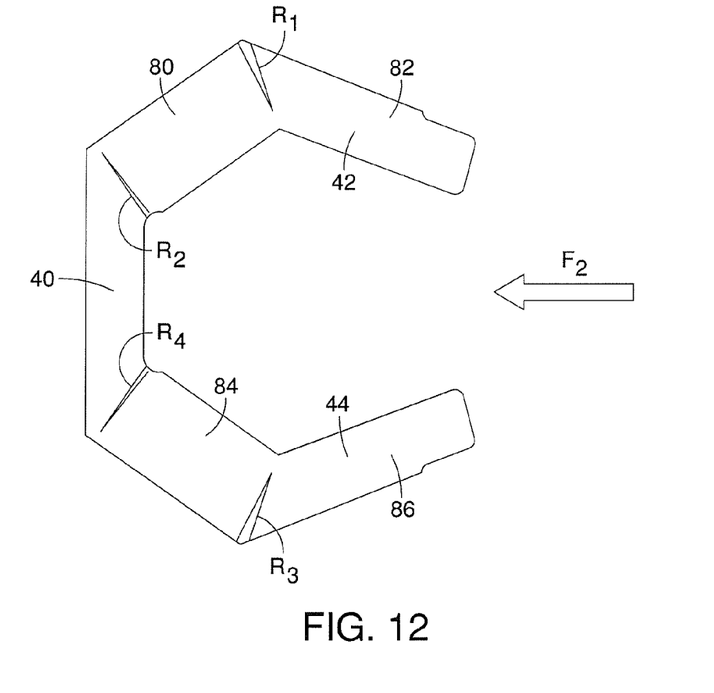
FIG. 12 is another schematic cross-sectional view of the vehicle front energy absorber showing the vehicle front energy absorber after a head-on impact event between the second and a third impact force range showing deformation at the first and second fracture regions greater than in indicated in FIG. 11, and with deformation at third and fourth fracture regions in accordance with the one embodiment.
Figure 13:
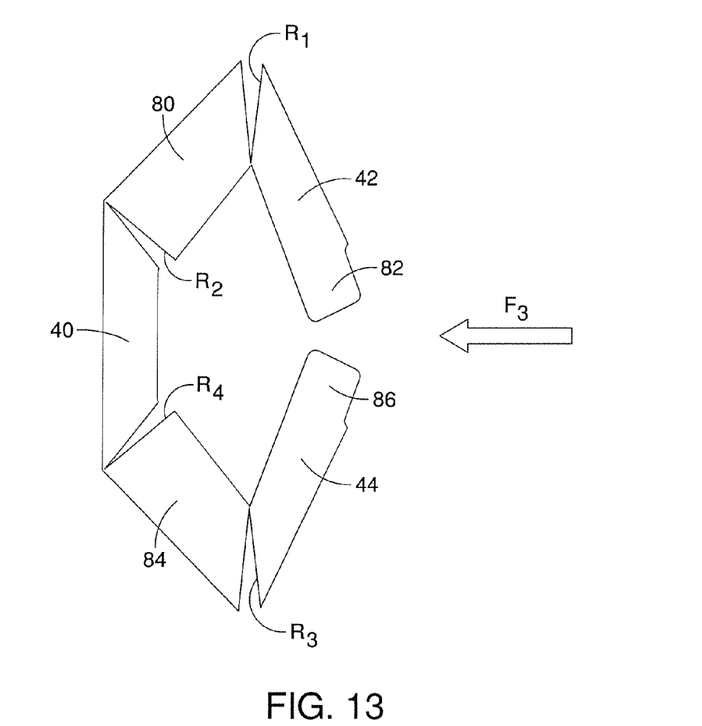
FIG. 13 is still another schematic cross-sectional view of the vehicle front energy absorber showing the vehicle front energy absorber after a head-on impact event between the third and a fourth impact force range showing fractures at the first and second fracture regions and fractures at the third and fourth fracture regions in accordance with the one embodiment.

As shown in FIGS. 11-13, the upper absorption section 42 can be considered as having two parts, a first upper part 80 and a second upper part 82. Specifically, the first upper part 80 is that portion extending forward from the upper lengthwise edge 50 of the back wall section 40 between the first upper surface 54 and the first upper channel surface 60. The second upper part 82 extends forward from the first upper part 80 between the second upper surface 56 and the first upper channel surface 62 to the upper distal end surface 58. A first upper fracture region $R_1$ is defined at the intersection of the first upper part 80 and the second upper part 82. Further, a second upper fracture region $R_2$ is defined at the intersection of the first upper part 80 and the back wall section 40.

The lower absorption section 44 includes a first lower part 84 and a second lower part 86. The first lower part 84 extends forward from the lower lengthwise edge 52 of the back wall section 40 between the first lower surface 64 and the first lower channel surface 70. The second lower part 86 extends forward from the first lower part 84 between the second lower surface 66 and the second lower channel surface 72 to the lower distal end surface 68. A first lower fracture region $R_3$ is defined at the intersection of the first lower part 84 and the second lower part 86. A second lower fracture region $R_4$ is defined at the intersection of the first lower part 84 and the back wall section 40.

The first upper fracture region $R_1$ and the first lower fracture region $R_3$ are configured to fracture at or above a first level of impacting force in response to a head-on impact event. The second upper fracture region $R_2$ and the second lower fracture region $R_4$ are configured to fracture in sequence with the first upper fraction region $R_1$ and the first lower fraction region $R_3$ at a second level of impacting force that is equal to or greater than the first level of impacting force in response to a head-on impact event. In other words, the energy absorber 14 is tuned such that the second level of impacting force will first fracture the first upper fracture region $R_1$ and the first lower fracture region $R_3$ and then fracture the second upper fracture region $R_2$ and the second lower fracture region $R_4$ in succession.

Consequently, in response to a head-on impacting force less than the first level of impacting force against distal ends 58 and 68 of the upper and lower absorption sections 42 and 44, the first upper fracture region $R_1$, the second upper fracture region $R_2$, the first lower fracture region $R_3$ and the second lower fracture region $R_4$ are configured to react by resiliently bending to absorb the impacting force. In other words, at levels below the first level of impacting force, the upper and lower absorption section 42 and 44 are resilient and return approximately to their non-impacted state after such low level force impacts.

In response to a head-on impact event, where the level of force is at least above the first level of impacting force, as indicated by the arrow $F_1$, the first upper fracture region $R_1$ and the first lower fracture region $R_3$ are configured to begin fracturing, as indicated in FIG. 11. If the energy absorber 14 is tuned such that the second level of impacting force is greater than the first level of impacting force and the level of force is between the first and second levels of impacting force, the second upper fracture region $R_2$ and the second lower fracture region $R_4$ are configured to react by resiliently bending to absorb the impacting force.

In response to a head-on impact event, where the level of force is at least above the second level of impacting force, as indicated by the arrow $F_2$, the first upper fracture region $R_1$ and the first lower fracture region $R_3$ are fully fractured, as indicated in FIG. 12, and the second upper fracture region $R_2$ and the second lower fracture region $R_4$ are configured to begin fracturing in the process of absorbing the impacting force. In other words, the energy absorber 14 is tuned such that the second level of impacting force will first fully fracture the first upper fracture region $R_1$ and the first lower fracture region $R_3$ and then begin to fracture the second upper fracture region $R_2$ and the second lower fracture region $R_4$ in succession.

Finally, as shown in FIG. 13, in response to a head-on impact event, where the level of force is above a third level of impacting force, as indicated by the arrow $F_3$, the first upper fracture region $R_1$, the first lower fracture region $R_3$, the second upper fracture region $R_2$ and the second lower fracture region $R_4$ are fully fractured in the process of absorbing the impacting force. The third level of impacting force is equal to or greater than the second level of impacting force. In other words, the energy absorber 14 is tuned such that the third level of impacting force will first fully fracture the first upper fracture region $R_1$ and the first lower fracture region $R_3$ and then fully fracture the second upper fracture region $R_2$ and the second lower fracture region $R_4$ in succession.

At higher levels of force and/or subsequent to any or all of the fractures described above, the first upper part 80 and the second upper part 82 fold against one another (overlying one another) and the first lower part 84 and the second lower part 86 fold against one another (overlying one another), thereby serving as a further cushion to absorb some of the impacting force. For example, at a speed of approximately 40 kilometers per hour, in an impact event test where the object impacting the vehicle is stationary, the forces are generally equivalent to the force indicated by the arrow $F_3$ in FIG. 13, resulting in the depicted deformation response.

Figure 14:
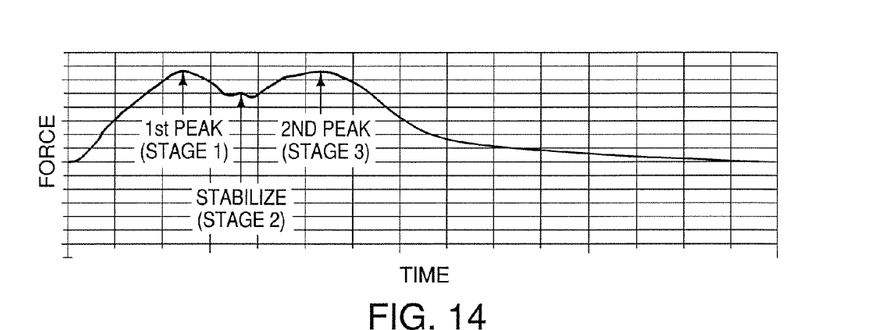
FIG. 14 is a graph showing the amounts of force absorbed by the vehicle front energy absorber during a single impact event, where stage 1 corresponds to FIG. 11, stage 2 corresponds to FIG. 12 and stage 3 corresponds to FIG. 13 in accordance with the one embodiment.

Another way to consider the response of the energy absorber 14 during a single impact event is presented in FIG. 14. FIG. 14 shows the measured force absorbed by the energy absorber 14 in fractions of seconds during an impact event. FIG. 14 indicates a first peak or first stage, a stabilizing section or second stage and a second peak or third stage of force absorption during the single impact event. The X-axis represents the fractions of a second during the impact event in FIG. 14. The Y-axis indicates the level of force absorbed during the impact event. The data shown in FIG. 14 was collected in a single impact event test which lasted mere seconds. Stage 1 corresponds to FIG. 11, stage 2 corresponds to FIG. 12 and stage 3 corresponds to FIG. 13. As indicated in FIGS. 11-13, in response to the single impact event where the level of force was greater than the third level of impacting force indicated by the arrow $F_3$, the first upper part 80 and the first lower part 84 move away from one another, while distal ends of the second upper part 82 and the second lower part 86 move toward one another. Consequently, FIGS. 11-13 depict an energy absorption process, whereby as the impact event progresses, the energy absorber 14 responds in a progression as depicted first in FIG. 11, milliseconds later, the event progresses as depicted in FIG. 12, and then finally progresses to the degree shown in FIG. 13, as is also indicated in FIG. 14. The test that produced the curve in FIG. 14 was conducted at a speed of approximately 40 kilometers per hour.

It should be understood from the drawings and the description herein that the actual force and/or speed at which the collapsing mechanism depicted in FIGS. 11-13 deforms as depicted varies from vehicle to vehicle and test to test. However, the inventors have reliably and repeatedly tested the energy absorber 14 and observed reproducible and consistent results with the configuration and shape of the energy absorber 14, as described above. In other words, in response to head-on impact events, the energy absorber 14 undergoes the described fracturing in a reproducible manner. For example, while head-on impact testing speeds of between 30-50 kilometers per hour may be of particular interest in the present invention, speeds above or below this range can conceivably achieve the deformation response depicted in FIG. 13, where the energy absorber 14 collapses on itself and thereby absorbs a predetermined amount of energy.

The actual force and/or speed of the vehicle 10 necessary to cause the energy absorber 14 to absorb energy as depicted in FIGS. 11-13 depends up the vehicle mass, environmental conditions and the object being impacted. Therefore, it should be understood that the speeds mentioned above are approximations. Tests have been conducted repeatedly at 40 kilometers per hour with consistent, reproducible results.

For the test conducted, the energy absorber 14 was manufactured with a foam density of between 3.5 and 5.0 pounds per cubic foot (pcf). The thickness $D_2$ and $D_4$ were between 15 mm and 30 mm and the angle $\alpha_1$ was 105 degrees.

Figure 4:
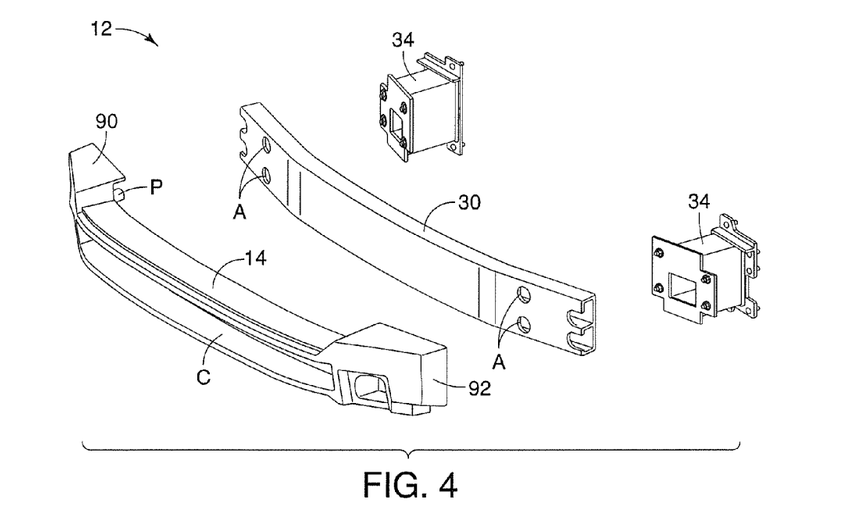
FIG. 4 is an exploded perspective view of portions of the front bumper assembly showing the vehicle front energy absorber in accordance with the one embodiment.
Figure 5:
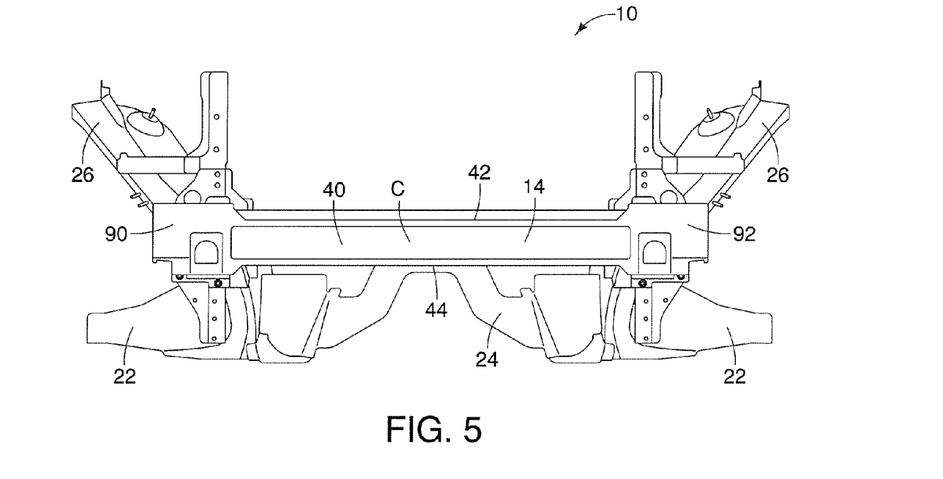
FIG. 5 is a front view of portions of the front end of the vehicle with the various elements and components removed showing the vehicle front energy absorber of the bumper assembly attached to the vehicle body structure of the vehicle in accordance with the one embodiment.
Figure 6:
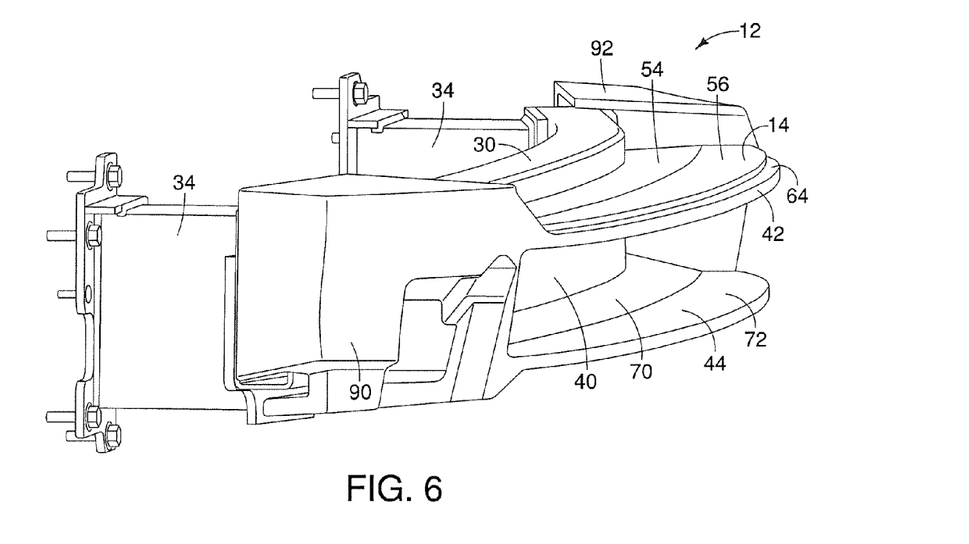
FIG. 6 is a perspective view of portions of the front bumper assembly showing the vehicle front energy absorber in accordance with the one embodiment.

As shown in FIG. 4, the energy absorber 14 also includes a first end 90 and a second end 92 that close ends of the channel C. Each of the first and second ends 90 and 92 includes an installation projection P that can be fitted into respective apertures A in the rigid reinforcement member 30 during installation. Typically, impact events occur locally near or at a center of the energy absorber 14. Consequently, the ends 90 and 92 have only a small effect on the results of impacting tests.

The vehicle 10 includes a plurality of features and elements that are conventional components that are well known in the art. Since such features and elements are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle front energy absorber. Accordingly, these terms, as utilized to describe the present invention should be interpreted relative to a vehicle equipped with the vehicle front energy absorber.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle front energy absorber comprising:
   a back wall section having front and rear lengthwise surfaces facing in opposite directions, the rear lengthwise surface of the back wall section having an upper lengthwise edge and a lower lengthwise edge;
   an upper absorption section having a first upper surface, a second upper surface and an upper distal end surface, the first upper surface extending frontward from the upper lengthwise edge with a first upper obtuse angle being defined between the rear lengthwise surface and the first upper surface, the second upper surface extending frontward from the first upper surface with a second upper obtuse angle being defined between the first upper surface and the second upper surface, the upper distal end surface extending downward away from the second upper surface; and
   a lower absorption section having a first lower surface, a second lower surface and a lower distal end surface, the first lower surface extending frontward from the lower lengthwise edge with a first lower obtuse angle being defined between the rear lengthwise surface and the first lower surface, the second lower surface extending frontward from the first lower surface with a second lower obtuse angle being defined between the first lower surface and the second lower surface, the lower distal end surface extending upward away from the second lower surface,
   the upper absorption section, the back wall section and the lower absorption section having a transverse U-shape in cross-section that defines a lengthwise concave channel having a longitudinal opening, the first upper surface and the first lower surface diverging away from one another in frontward directions from the back wall section, the second upper surface of the upper absorption section and the second lower surface of the lower absorption section extend perpendicularly to the rear lengthwise surface of the back wall section.

2. The vehicle front energy absorber according to claim 1, wherein
   the upper distal end surface of the upper absorption section extends parallel to the rear lengthwise surface of the back wall section, and
   the lower distal end surface of the lower absorption section extends parallel to the rear lengthwise surface of the back wall section.

3. The vehicle front energy absorber according to claim 1, wherein
   the rear lengthwise surface of the back wall section has a lateral arcuate contour viewed from above.

4. The vehicle front energy absorber according to claim 1, wherein
   the second upper surface of the upper absorption section includes a rabbet along the upper distal end surface of the upper absorption section, and
   the second lower surface of the lower absorption section includes a rabbet along the lower distal end surface of the lower absorption section.

5. The vehicle front energy absorber according to claim 1, wherein
   the first upper obtuse angle and the first lower obtuse angle are between 95 and 115 degrees, and
   the second upper obtuse angle and the second lower obtuse angle are between 155 and 175 degrees.

6. The vehicle front energy absorber according to claim 5, wherein
   the first upper obtuse angle and the first lower obtuse angle are both 105 degrees, and
   the second upper obtuse angle and the second lower obtuse angle are both 165 degrees.

7. The vehicle front energy absorber according to claim 1, wherein
   a first line intersecting with the upper lengthwise edge perpendicular to the rear lengthwise surface of the back wall section passes through a central region of the upper distal end surface and a second line intersecting with the lower lengthwise edge perpendicular to the rear lengthwise surface of the back wall section passes through a central region of the lower distal end surface.

8. The vehicle front energy absorber according to claim 1, wherein
   the back wall section, the upper absorption section and the lower absorption section are formed together as a single, unitary, monolithic element.

9. A vehicle front energy absorber comprising:
   a back wall section having front and rear lengthwise surfaces facing in opposite directions, the rear lengthwise surface of the back wall section having an upper lengthwise edge and a lower lengthwise edge;
   an upper absorption section having a first upper surface, a second upper surface and an upper distal end surface, the first upper surface extending frontward from the upper lengthwise edge with a first upper obtuse angle being defined between the rear lengthwise surface and the first upper surface, the second upper surface extending frontward from the first upper surface with a second upper obtuse angle being defined between the first upper surface and the second upper surface, the upper distal end surface extending downward away from the second upper surface; and
   a lower absorption section having a first lower surface, a second lower surface and a lower distal end surface, the first lower surface extending frontward from the lower lengthwise edge with a first lower obtuse angle being defined between the rear lengthwise surface and the first lower surface, the second lower surface extending frontward from the first lower surface with a second lower obtuse angle being defined between the first lower surface and the second lower surface, the lower distal end surface extending upward away from the second lower surface, the upper absorption section, the back wall section and the lower absorption section having a transverse U-shape in cross-section that defines a lengthwise concave channel having a longitudinal opening, the first upper surface and the first lower surface diverging away from one another in frontward directions from the back wall section, the upper absorption section includes a first upper channel surface and a second upper channel surface extending along the channel, the first upper channel surface extending frontward from an upper end of the front lengthwise surface of the back wall section, and the second upper channel surface extending frontward from the first upper channel surface parallel to the second upper surface, and the lower absorption section includes a first lower channel surface and a second lower channel surface extending along the channel, the first lower channel surface extending frontward from a lower end of the front lengthwise surface of the back wall section, and the second lower channel surface extending frontward from the first lower channel surface parallel to the second lower surface.

10. The vehicle front energy absorber according to claim 9, wherein
the second upper channel surface of the upper absorption section and the second lower channel surface of the lower absorption section extend perpendicularly to the rear lengthwise surface of the back wall section.

11. The vehicle front energy absorber according to claim 9, wherein
the back wall section has a first thickness measured between the front and rear lengthwise surfaces,
the upper absorption section has a second thickness measured between the second upper channel surface and the second upper surface, the second thickness being greater than the first thickness, and
the lower absorption section has a thickness measured between the first lower channel surface and the first lower surface that is equal to the second thickness.

12. The vehicle front energy absorber according to claim 11, wherein
the upper absorption section has a third thickness measured between the first upper channel surface and the first upper surface, the third thickness being greater than the first and second thicknesses, and
the lower absorption section has a thickness measured between the first lower channel surface and the first lower surface that is equal to the third thickness.

13. The vehicle front energy absorber according to claim 9, wherein
the upper absorption section includes a first upper part and a second upper part, the first upper part extending from the upper lengthwise edge of the back wall section between the first upper surface and the first upper channel surface, the second upper part extending from the first upper part between the second upper surface and the first upper channel surface to the upper distal end surface, with a first upper fracture region being defined at the intersection of the first upper part and the second upper part, and a second upper fracture region being defined at the intersection of the first upper part and the back wall section, and
the lower absorption section includes a first lower part and a second lower part, the first lower part extending from the lower lengthwise edge of the back wall section between the first lower surface and the first lower channel surface, the second lower part extending from the first lower part between the second lower surface and the second lower channel surface to the lower distal end surface, with a first lower fracture region being defined at the intersection of the first lower part and the second lower part, and a second lower fracture region being defined at the intersection of the first lower part and the back wall section, the first upper fracture region and the first lower fracture region being configured to fracture at a first level of impacting force, and the second upper fracture region and the second lower fracture region being configured to fracture in sequence with the first upper fracture region and first lower fracture region at a second level of impacting force that is at least as great as the first level of impacting force.

14. The vehicle front energy absorber according to claim 13, wherein
the upper and lower absorption sections are configured such that in response to a head-on impacting force less than the first level of impacting force against distal ends of the upper and lower absorption sections, the first upper fracture region, the second upper fracture region, the first lower fracture region and the second lower fracture region resiliently bend to absorb the impacting force.

15. The vehicle front energy absorber according to claim 14, wherein
the upper and lower absorption sections are configured such that in response to a head-on impacting force at least greater than the first level of impacting force against distal ends of the upper and lower absorption sections, the first upper fracture region and the first lower fracture region hingedly bend and thereafter fracture, moving away from one another such that the distal ends of the upper and lower absorption sections move at least a first distance toward the wall section.

16. The vehicle front energy absorber according to claim 15, wherein
the upper and lower absorption sections are configured such that in response to a head-on impacting force greater than the first level of impacting force and less than the second level of impacting force against distal ends of the upper and lower absorption sections, the first upper fracture region and the first lower fracture region hingedly bend and thereafter fracture, moving away from one another such that the distal ends of the upper and lower absorption sections move at least a second distance toward the back wall section greater than the first distance, and the second upper fracture region and the second lower fracture region resiliently bend.

17. The vehicle front energy absorber according to claim 15, wherein
the upper and lower absorption sections are configured such that in response to a head-on impacting force at least greater than the second level of impacting force against distal ends of the upper and lower absorption sections, the first upper fracture region and the first lower fracture region hingedly bend and thereafter fracture, and in succession the second upper fracture region and the second lower fracture region hingedly bend and thereafter fracture, with the first upper fracture region and the first lower fracture region moving away from one another such that the distal ends of the upper and lower absorption sections move at least a second distance toward the back wall section greater than the first distance.

18. The vehicle front energy absorber according to claim 15, wherein
the upper and lower absorption sections are configured such that in response to a head-on impacting force at least greater than the second level of impacting force against distal ends of the upper and lower absorption sections, the first upper fracture region and the first lower fracture region hingedly bend and thereafter fracture, and in succession the second upper fracture region and the second lower fracture region hingedly bend and thereafter fracture, with the first and second upper parts of the upper absorption section folding, lying over one another and overlaying a first portion of the wall section, and the first and second lower parts of the lower absorption section folding, lying over one another and overlaying a second portion of the wall section.

19. The vehicle front energy absorber according to claim 9, wherein
a first line intersecting with the upper lengthwise edge perpendicular to the rear lengthwise surface of the back wall section passes through a central region of the upper distal end surface and a second line intersecting with the lower lengthwise edge perpendicular to the rear lengthwise surface of the back wall section passes through a central region of the lower distal end surface;
a third line centered between the second upper surface and the second upper channel surface is located above and parallel to the first line, and
a fourth line centered between the second lower surface and the second lower channel surface is located below and parallel to the first line.

20. A vehicle front energy absorber comprising:
a back wall section having front and rear lengthwise surfaces facing in opposite directions, the rear lengthwise surface of the back wall section having an upper lengthwise edge and a lower lengthwise edge;
an upper absorption section having a first upper surface, a second upper surface and an upper distal end surface, the first upper surface extending frontward from the upper lengthwise edge with a first upper obtuse angle being defined between the rear lengthwise surface and the first upper surface, the second upper surface extending frontward from the first upper surface with a second upper obtuse angle being defined between the first upper surface and the second upper surface, the upper distal end surface extending downward away from the second upper surface; and
a lower absorption section having a first lower surface, a second lower surface and a lower distal end surface, the first lower surface extending frontward from the lower lengthwise edge with a first lower obtuse angle being defined between the rear lengthwise surface and the first lower surface, the second lower surface extending frontward from the first lower surface with a second lower obtuse angle being defined between the first lower surface and the second lower surface, the lower distal end surface extending upward away from the second lower surface,
the upper absorption section, the back wall section and the lower absorption section having a transverse U-shape in cross-section that defines a lengthwise concave channel having a longitudinal opening, the first upper surface and the first lower surface diverging away from one another in frontward directions from the back wall section,
the upper absorption section includes a first upper channel surface and a second upper channel surface extending along the channel, the first upper channel surface extending frontward from an upper end of the front lengthwise surface of the back wall section parallel to the first upper surface, and the second upper channel surface extending frontward from the first upper channel surface, and
the lower absorption section includes a first lower channel surface and a second lower channel surface extending along the channel, the first lower channel surface extending frontward from a lower end of the front lengthwise surface of the back wall section parallel to the first lower surface, and the second lower channel surface extending frontward from the first lower channel surface.

* * * * *